O. C. WINESTOCK.
APPARATUS FOR TREATING PULP.
APPLICATION FILED SEPT. 11, 1918.

1,389,281.

Patented Aug. 30, 1921.
6 SHEETS—SHEET 1.

O. C. WINESTOCK.
APPARATUS FOR TREATING PULP.
APPLICATION FILED SEPT. 11, 1918.

1,389,281.

Patented Aug. 30, 1921.
6 SHEETS—SHEET 6.

Inventor
Otto C. Winestock
By Attorney
George Ramsey

UNITED STATES PATENT OFFICE.

OTTO CHARLES WINESTOCK, OF PERKINSVILLE, VERMONT.

APPARATUS FOR TREATING PULP.

1,389,281.   Specification of Letters Patent.   Patented Aug. 30, 1921.

Application filed September 11, 1918. Serial No. 253,515.

*To all whom it may concern:*

Be it known that I, OTTO C. WINESTOCK, a citizen of the United States, residing at Perkinsville, in the county of Windsor, State of Vermont, have invented certain new and useful Improvements in Apparatus for Treating Pulp, of which the following is a specification.

The present invention relates broadly to paper manufacture and more particularly to an apparatus for removing ink, fillers, and extraneous matter from reclaimed paper pulp so that the pulp is in condition for remaking into paper.

The principal object of the present invention is a continually operating machine through which pulp is adapted to pass and the ink, the filler and other extraneous substances are separated from the pulp during the passage through the machine without injury to the fibers of the pulp.

Another object of the present invention is a machine for treating paper pulp obtained from paper stock by defibering the paper stock, (as for example, by means of any well known manner of producing paper pulp stock) in such manner that foreign substances such as ink, etc., are quickly and thoroughly separated from the pulp and with a small loss of fiber during the separating operation.

Another object of the present invention is an apparatus as specified and wherein the pulp is continuously agitated and sprayed with cleansing water during the agitation so that the ink and extraneous matter are carried away.

A still further and important object of the present invention is an apparatus for quickly and continuously separating ink and extraneous matter from recovered paper pulp without flattening or crushing the fibers of the pulp.

A further and more specific object of the present invention is an apparatus as specified wherein the paper pulp is fed through a series of troughs and is agitated while being sprayed with cleansing water in such manner that the ink and foreign substances are overflowed from the sides of the troughs.

A still further object of the present invention is an apparatus as specified and wherein means are provided for moving paper pulp longitudinally of a trough in which is arranged a rotating agitator having hollow blades provided with spray openings so that the pulp is continually sprayed with cleansing water while being agitated and in such manner that the pulp moves longitudinally of the trough while ink and extraneous matter is flowed over the sides of the trough.

The invention possesses many other and advantageous features, some of which, together with the foregoing, will be set out more at length in the following description wherein will be outlined in full that form of the invention which I have selected for illustration in the drawings accompanying and forming a part of the present specification.

In the drawings and specification I have disclosed only the preferred form of my generic invention, but, it is to be understood that I do not limit myself to such form because my invention may be embodied in a multiplicity of forms each being a species of my invention. It being understood that by the claims succeeding the description of my invention I desire to cover the invention in whatsoever form it may be embodied and practised.

In the drawings like characters are used to represent like parts throughout the several figures thereof.

Heretofore in paper manufacture the most common system in using reclaimed paper stock has been to make up the remade paper directly from the macerated pulp. It is obvious where this is done that the resulting product necessarily will include all ink and other extraneous foreign matter which is carried by the original paper stock from which the pulp has been formed. Such paper, obviously, is a low grade paper. Various roller and washing processes have been tried in attempting to remove the ink and foreign substances and in all cases with which the applicant is familiar the fibers were crushed and injured or the purifying and cleansing process requires so much time and wastes so much pulp that such processes were not commercially successful. The processes of the prior art which nearest approaches commercial success is the use of the well known beater engine used in paper making; the operation of which requires a great deal of time in order to produce an effective result.

The present invention, which is in part a continuation of my application Serial No. 191,842 filed September 17, 1917, overcomes the difficulties of the known prior art by providing a continuously operating apparatus which completely removes the ink and foreign substances from properly defibered paper pulp. In the operation of the present apparatus the fibers are gently agitated and subjected to cleansing water during the agitation. The cleansing of the pulp, therefore, is accomplished without injuring the fibers in the slightest and without subjecting the fibers to attrition, and, consequently the cleansing operation is effective without serious fiber loss. The agitation is accomplished by means of gently curved hollow paddles which have spray openings on the edges and mounted upon a hollow shaft that is supplied with water under pressure so that as the shaft rotates the paddles passing through the pulp pick up a portion of the pulp which slides from the edges of the paddles and encounters water sprays during the time when it is falling from the paddles. This action not only cleans and purifies the pulp but homogenizes the product so that an even smooth stock is obtained when the material has been passed through the machine. Tumbling screen drums and stationary troughs provided with screen bottoms have been suggested for cleansing and washing pulp but in these devices the greatest weight of pulp is directly over the exit through which the foreign substances are attempted to be carried and where such devices are utilized for washing reclaimed pulp stock, the ink, which has a slightly oily nature, is ground into the fiber and cleansing then becomes substantially impossible. In the present apparatus it will be noted that the bottom of the trough is imperforate and the cleansing takes place from the bottom of the trough upwardly so that the extraneous and foreign substances are overflowed from the top of the pulp mixture.

Figure 1:
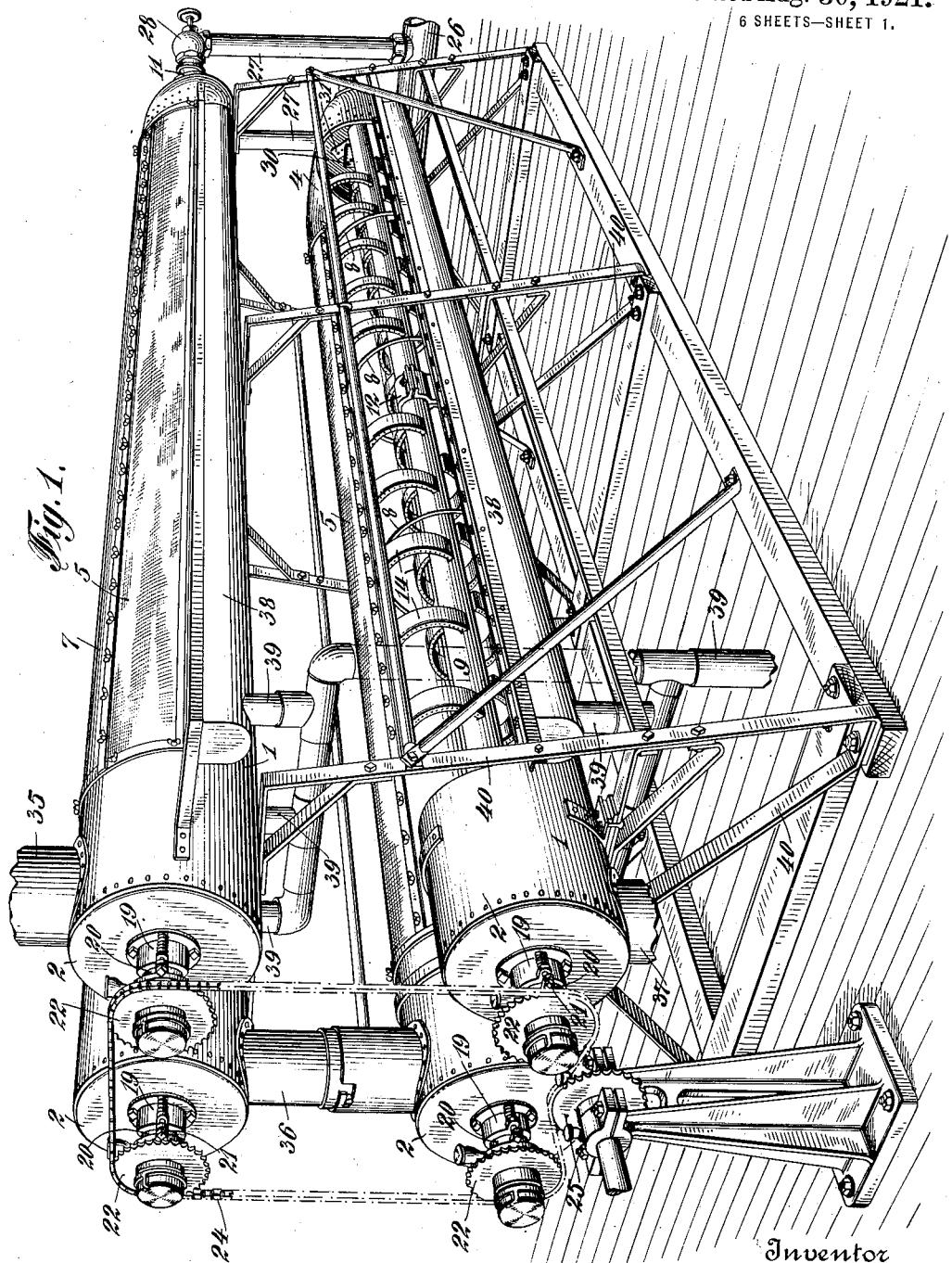
Figure 1 is a perspective view of one form of the apparatus embodying my present invention.
Figure 2:
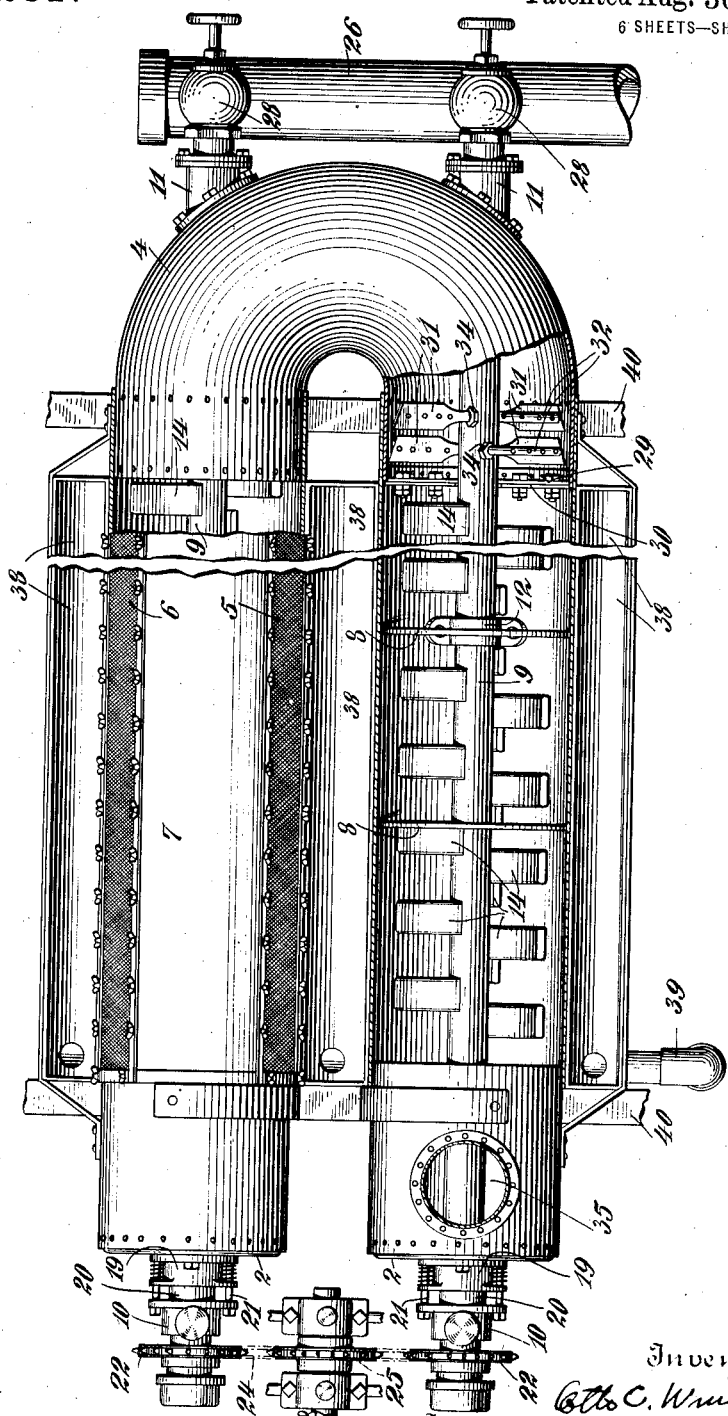
Fig. 2 is a plan view showing the cover and screens removed from one tube or unit.
Figure 3:
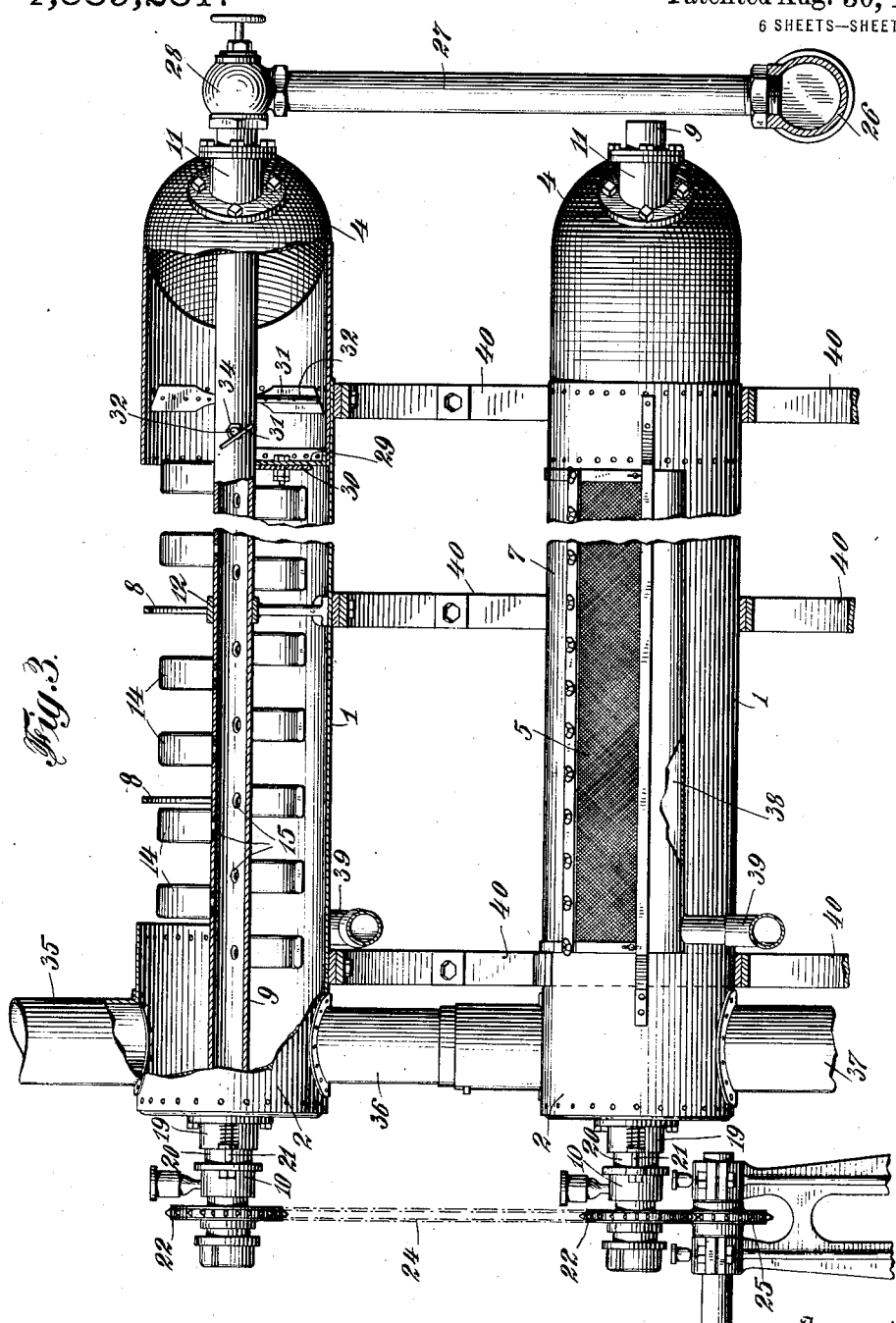
Fig. 3 is a side view showing the upper tube or unit in vertical longitudinal section.
Figure 4:
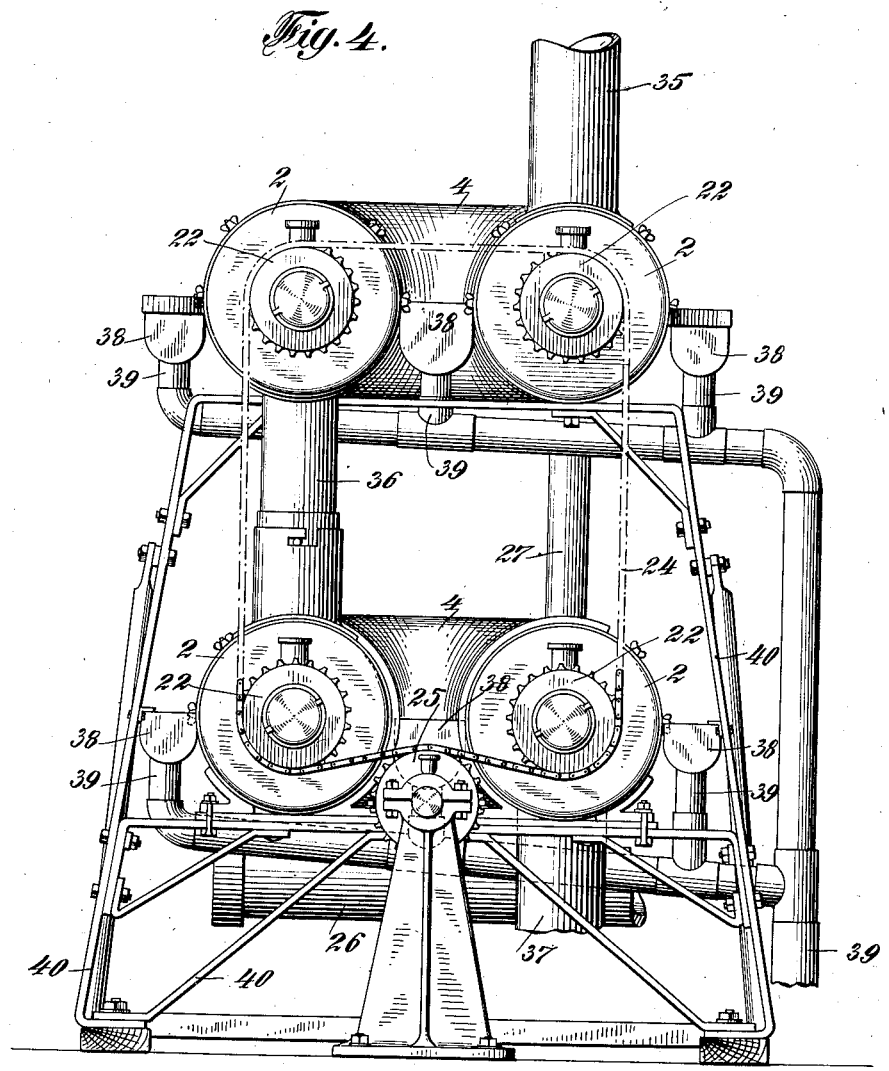
Fig. 4 is a view of the front end of the apparatus.
Figure 5:
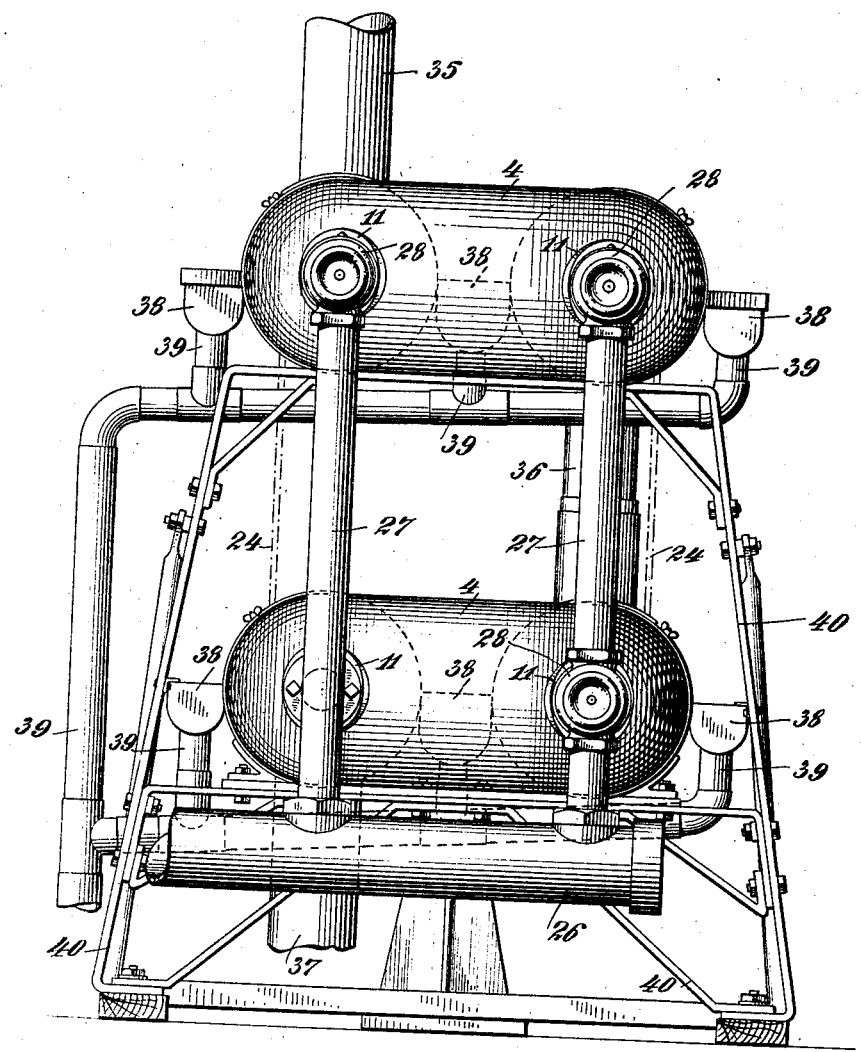
Fig. 5 is a view of the rear end of the apparatus.
Figure 6:
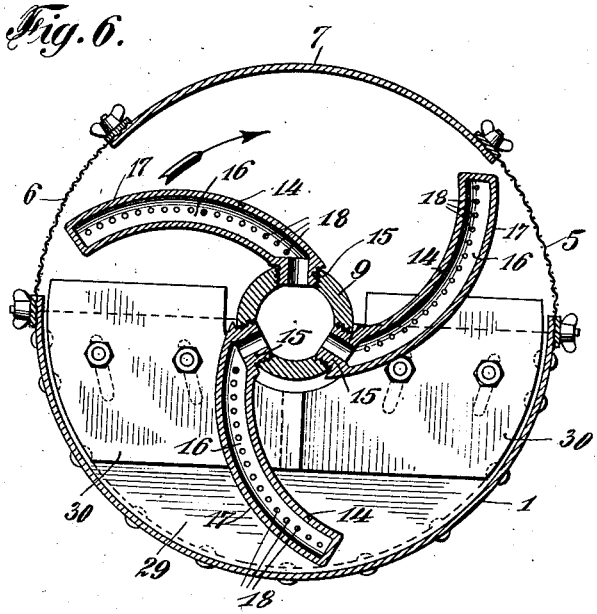
Fig. 6 is a transverse sectional view through one trough or unit.
Figure 7:
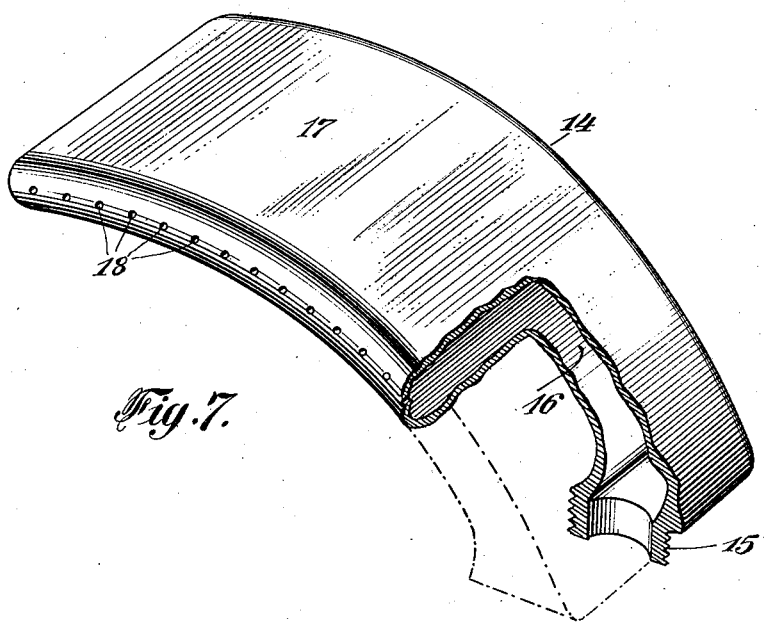
Fig. 7 is a detail view of the one washer blade showing a portion thereof in section.

Referring now to the drawings, the device, in order to occupy a minimum of floor space, preferably comprises a plurality of units, each of which is made up of a trough 1, which is formed of imperforate material, preferably sheet metal. The front ends of the troughs 1 are secured to cylindrical portions 2 and the rear ends of the troughs are connected by large elbows or U-shaped members 4. Each unit is provided with a pair of screens 5 and 6 between which is provided a cover 7. The screens are removably attached to the troughs 1 and the cover 7 by means of thumb nuts or wing nuts 3, so that the screens may be removed for cleaning or for any other desired reason. The screens are of fine mesh, preferably about seventy meshes to the linear inch. The screens and the covers are supported upon the cylindrical members 2 and the cylindrical portions of the U-shaped members 4 as well as upon supporting ribs 8 which extend upwardly from the side edges of the trough 1. Each trough is provided with a tubular shaft 9 which extends lengthwise of the trough and is mounted in a bearing 10 carried by the head of the cylindrical member 2 and a bearing 11 carried by the U-shaped member 4. Preferably a middle bearing 12 is provided adjacent the middle of the shaft in order to steady the device when in operation. These shafts 9 carry paddles 14 (see Figs. 6 and 7). These paddles are hollow and are provided with hollow screw threaded studs 15 that are screwed into the openings in the hollow shaft 9 so that the chambers 16 in the paddles 14 are in communication with the interior of the shaft 9. These paddles are curved and are provided with smooth outer surfaces 17 so that as the shaft 9 rotates the pulp will be gently lifted upon these surfaces and will slide easily therefrom. Spray openings 18 are provided in these paddles 14 and while the openings may be arranged in various portions of the paddle, preferably they are arranged adjacent the edges of the paddle so that the pulp is subjected to the spraying action while it is being agitated by the paddles and is thoroughly washed as it is lifted and dropped from the surfaces of the paddles. The curvature of these paddles is such that the pulp is gently thrown outward toward the screens 5 and 6. The bearings 10 comprise housings 19 in which are seated gasket supports 20 to comprise stuffing boxes. Spring carrying bolts 21 extend through the flanges of the members 19 and 20 so that the gasket material is at all times maintained under a proper compression to maintain a water tight joint around the shaft. Each shaft is equipped with a driving device which in the present case may comprise sprocket wheel 22 and these sprocket wheels are connected by means of a chain 24 so that all of the shafts are simultaneously driven. The driving mechanism may be any well known type of drive, for example, a drive sprocket 25 operated by a suitable electric motor or other prime motor. The bearings 11 at the rear end of the troughs my be any well known form of gasket construction and preferably each shaft, except that of the last unit, is connected with a water supply, comprising a water-main 26, connecting pipes 27 and valves 28 for each of the three connected tubular shafts. The last trough through which the pulp moves preferably is not provided with a water supply for the reason that there is sufficient water in the pulp when it reaches this stage to complete the final cleansing and this unit or section operates to remove excess water so that when the pulp leaves the machine it is in proper condition for further handling in the process of making paper and carries sufficient water to flow readily as is required.

Preferably the imperforate sides of the troughs 1 terminate below the horizontal diameter of the cylindrical members 2 and a dam 29 is provided adjacent the outlet end of each trough. These same dams (see Fig. 6) may be provided with removable wings 30 which are adapted to be set so that the normal height of pulp in the troughs will be slightly above the imperforate sides of the troughs and extend slightly into the side screens. The working height of the pulp may depend upon the character of the pulp, but ordinarily the dam should be set to maintain about one inch of pulp in the sides of the screen. The adjustment device for the wings 30 of the dams may comprise simple devices such as short bolts equipped with lock nuts. Preferably the troughs are arranged horizontally so that the head of pulp flowing through the troughs is relied upon to cause the movement of the pulp along the troughs. However, it is desirable that the pulp flow over the dams 29 freely and therefore propulsive paddles 31 may be provided to take away the pulp after it has overflowed a dam 29 and to further facilitate the movement of the pulp into and through the next stage or unit of the device. These propulsive paddles 31 are mounted on adjustable supports which may comprise tubes 32 screw threaded into the shafts 9 and with each tube provided with a lock nut 34 so that the inclination of the paddles may be adjusted. There may be conditions wherein it will be desirable to retard the flow of pulp through the device and therefore the arrangement provides for adjusting these paddles to effect a retarding rather than a propulsive action. One section or unit is provided with an inlet as at 35 and the adjacent tube is provided with a connection as at 36 which leads to the lower unit and the last unit is provided with an outlet 37. In order to carry away the waste water, water troughs 38 are provided adjacent the lower edges of the screens 5 and these troughs are connected by suitable water spouts or pipes 39 with outlets for the waste water. Where the amount of water used is an item, it has been found possible to filter the water from the two last units and use this filtered water over again since the majority of the ink and dirt is removed from the pulp by the first two units.

The device may be mounted in various ways, for example upon a suitable frame 40. In operation it has been found that relatively low speeds for the shafts 9 are satisfactory and sufficient to effectively operate the device, and as a consequence the device operates with relatively small power consumption. It is obvious that the various units may be arranged in different numbers or orders from that herein disclosed or as a matter of fact if desirable the device may comprise a single unit elongated sufficiently to thoroughly cleanse the pulp by the time the pulp has reached the outlet end thereof.

I particularly desire to emphasize the feature of this apparatus whereby the ink and foreign matter is removed from the pulp by flooding the extraneous matter from the upper portions of the pulp mass instead of grinding the pulp under pressure adjacent the zone to which the foreign matter is carried by action of the cleansing fluid, and I also desire to emphasize the homogenizing effect which the present apparatus has on pulp passing through it.

Having described my invention, what I claim is:—

1. An apparatus for treating paper pulp or the like comprising in combination an imperforate trough, screens arranged above the sides of said trough, removable fastening means for said screens whereby the same may be removed as described, a cover portion between said screens and extending substantially the full length thereof, a dam adjacent the outlet end of said trough and adapted to control the height of paper pulp, a hollow shaft extending lengthwise of said trough, a plurality of hollow curved blades carried upon said shaft and being provided with spray openings, propulsion paddles also mounted upon said shaft and being adapted to be adjusted to control the movement of paper pulp through the said trough, and means for supplying water to said hollow shaft.

2. A device for treating paper pulp comprising in combination a trough having an imperforate bottom, screens extending upwardly from the edges of said trough, a dam at the outlet end of said trough to normally maintain the paper pulp at such height that the surface of the paper pulp is above the edges of said trough, a hollow shaft extending lengthwise of said trough and curved blades mounted on the shaft and having smooth outer surfaces, said blades being hollow and having the hollow chamber therein connected with the interior of the said shaft and further being provided with spray openings in the edges of the said blades, and means to supply said shaft with water under pressure.

3. A device of the character described comprising in combination an imperforate trough, screens on each side of said trough, means to agitate pulp within said trough and to spray said pulp with cleansing fluid during the agitation, and means for maintaining the surface of the pulp above the edges of said trough in such manner that a portion of the paper pulp adjacent the surface thereof is supported by the said screens so that the cleansing fluids may escape from the pulp adjacent the surface thereof.

4. A pulp washing machine comprising in combination a longitudinally extending container for pulp through which the pulp is adapted to move, screens at the side of said container, means for maintaining the level of the pulp within said container at such height that the surface of the pulp is slightly above the lower edge of said screens, and means for agitating pulp within said container and supplying wash water thereto during the agitation, the device being constructed in such manner that the wash water for the pulp escapes through the screens adjacent the surface of the said pulp.

5. A device of the character described comprising in combination a plurality of stationary imperforate troughs being connected in series, screens adjacent the upper edges of certain of said troughs, agitating means within said troughs and adapted to throw the pulp against said screens, means for washing the pulp during agitation and for permitting the wash water to escape through said screens, and troughs for carrying away the said wash water.

6. A pulp washing machine comprising in combination a trough having an imperforate bottom, means provided adjacent the edge of said trough to permit the escape of wash water, a hollow shaft extending longitudinally of said trough, a plurality of curved agitator blades carried by said shaft, outer surfaces of said blades being substantially parallel to the axis of said shaft and the curvature of said blades extending in the opposite direction to the rotation of the said shaft whereby the action of said blades tends to throw the pulp upwardly and outwardly, said blades being provided in their edges with spray openings, and means to supply said hollow shaft and said blades with water under pressure.

7. A device for washing pulp and the like comprising in combination a horizontally mounted imperforate trough through which the pulp to be washed is adapted to move, means adjacent the edges of said trough to permit the escape of wash water, means for maintaining the level of the pulp within said trough above the edges of said trough, and devices for lifting said pulp and spraying the same with wash water whereby the wash water may escape from said pulp adjacent the surface thereof.

8. A continuous washing apparatus comprising a stationary tube having an imperforate bottom portion and a perforate upper portion, means for feeding the material to be washed to said tube, and means for agitating and washing said material during its passage through the tube.

9. A continuous washing apparatus comprising a tube having an imperforate bottom portion and a perforate upper portion, means for feeding the material to be washed to said tube, an adjustable dam carried by the imperforate portion of said tube for controlling the outlet therefrom, and means for agitating and washing said material during its passage through the tube.

10. A continuous washing apparatus comprising a plurality of interconnected tubes having imperforate bottom portions and perforate upper portions, means for feeding the material to be washed to said tubes, means for causing the material to travel through said tubes, and means for agitating and washing the material during said movement.

11. A continuous washing apparatus comprising a plurality of tubes, means for feeding the material to be washed to said tubes, means for agitating said material and causing a movement thereof through the tubes, and means for supplying water to said material during the agitation thereof to wash the same, said tubes being constructed to permit the escape of said water as it becomes soiled.

12. A continuous washing apparatus comprising a tube having an imperforate lower portion and a perforate upper portion, means for feeding the material to be washed to said tube, a hollow shaft within said tube, conveying means on said shaft, and means for rotating the same to cause an agitating and feeding movement of the material in the tube.

13. A washing apparatus comprising a tube having an imperforate lower portion and a perforate upper portion, a hollow shaft within said tube, means for supplying a washing fluid to said shaft, distributing fingers for said fluid carried by said shaft, and means for rotating said shaft to cause agitation of the material and a distribution of the cleansing fluid therethrough.

OTTO CHARLES WINESTOCK.